June 18, 1968  E. HOSTETLER  3,388,690
POULTRY FEEDER SYSTEM AND PAN ASSEMBLY THEREFOR
Filed Oct. 22, 1965  2 Sheets-Sheet 2
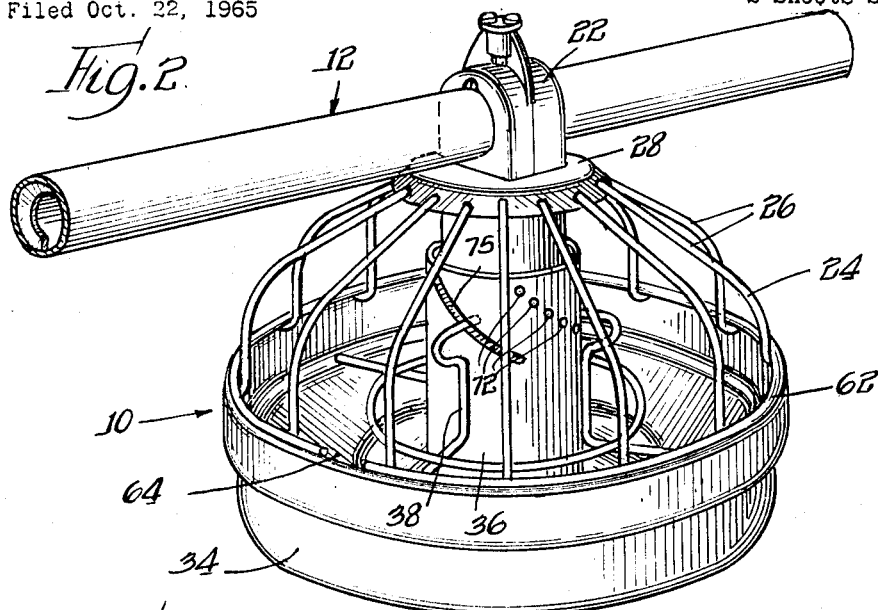
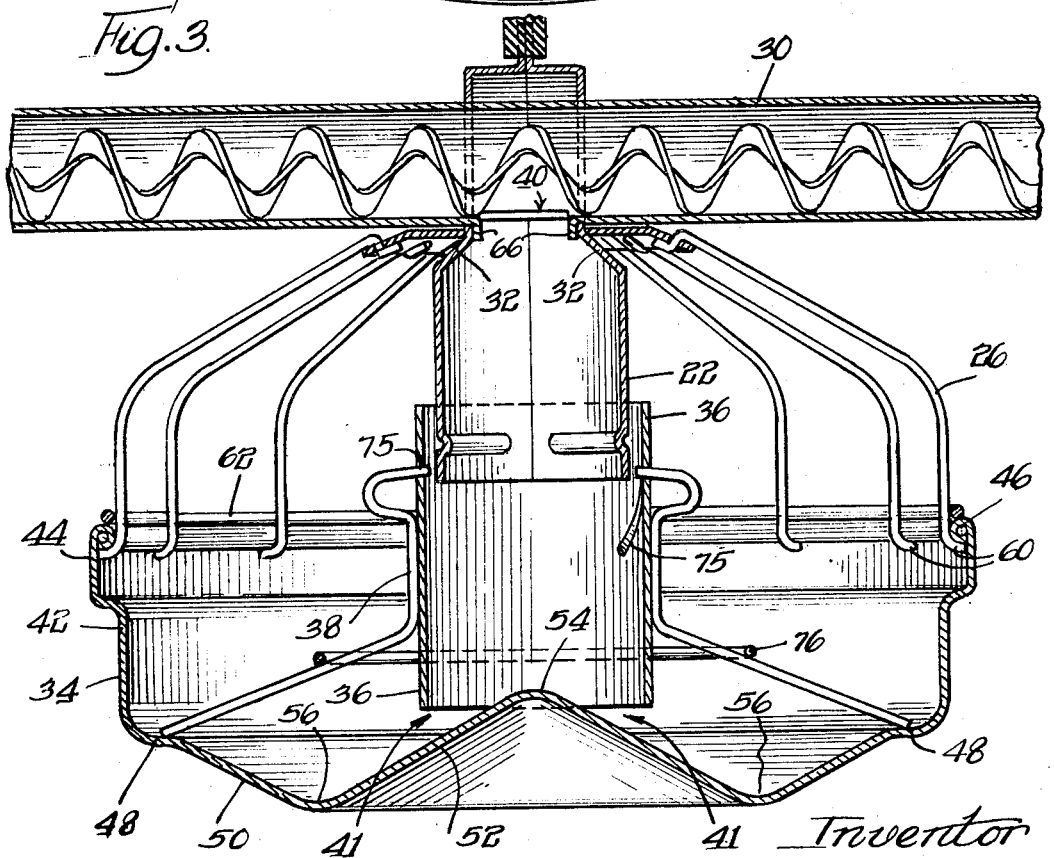
Inventor
Eldon Hostetler
By Olson, Trexler, Wolters & Bushnell
attys.

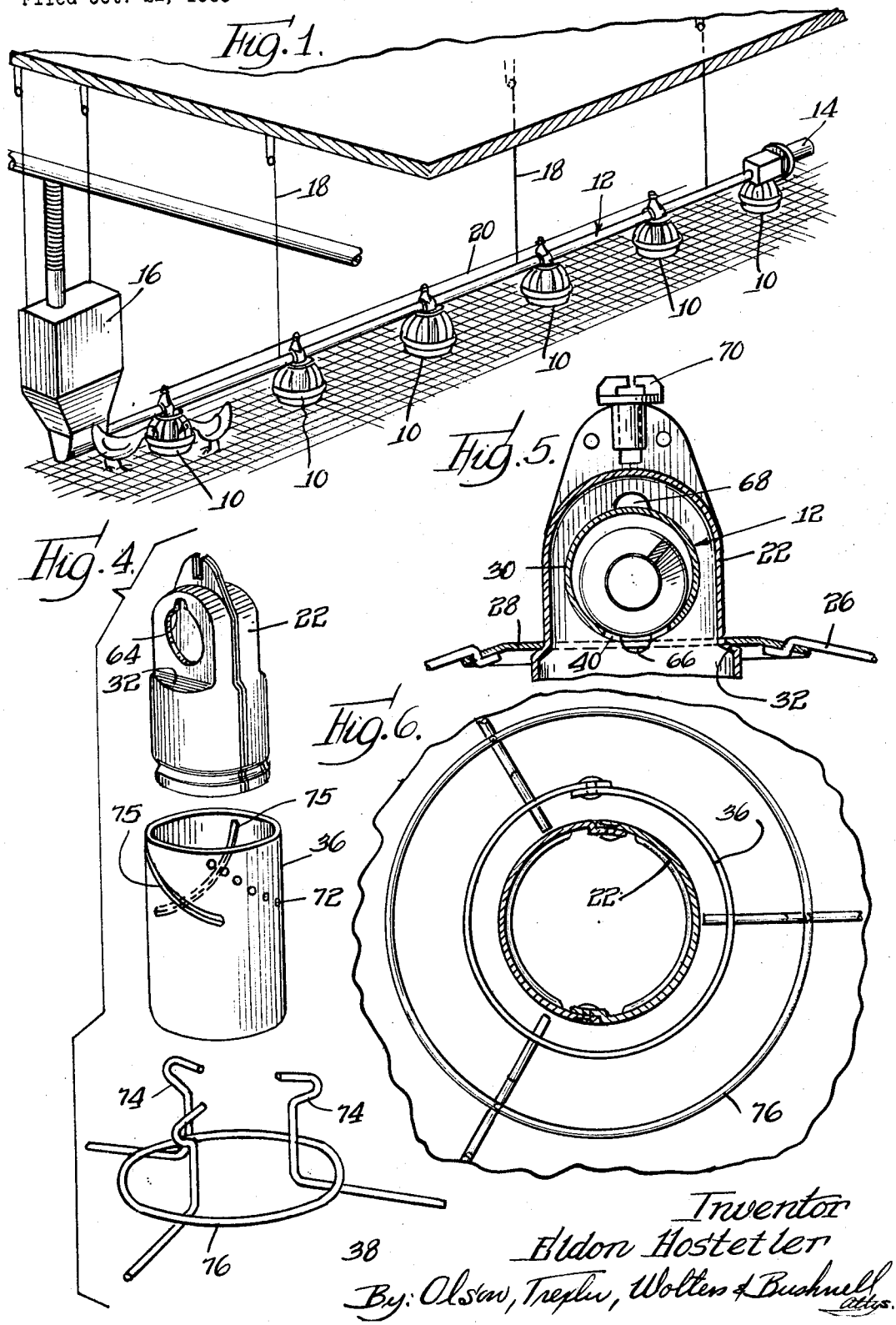

United States Patent Office 3,388,690
Patented June 18, 1968

3,388,690
POULTRY FEEDER SYSTEM AND PAN
ASSEMBLY THEREFOR
Eldon Hostetler, Middlebury, Ind., assignor to Chore-Time Equipment, Inc., Milford, Ind., a corporation of Indiana
Filed Oct. 22, 1965, Ser. No. 500,569
7 Claims. (Cl. 119—53)

ABSTRACT OF THE DISCLOSURE

A poultry feeder system comprising a feed source, a feed pan, and means for conducting feed from said source to said pan. The feed pan includes a substantially vertical side portion, a radially inward extending ledge connected to the bottom of said side portion, a downwardly sloping surface connected to said ledge, and a conical surface connected to said downwardly sloping surface. An adjustable feed control cylinder having a single series of indexing holes and a plurality of indexing slots is supported on the ledge of the bottom portion of the pan by means of support legs. The cylinder is adjusted relative to the conical portion of the feed pan depending upon into which indexing holes and slots the support legs are fitted, and the amount of feed delivered to the pan is correspondingly varied. The side portions of the feed pan have an annularly outwardly extending protuberance and an inwardly projecting bead at the uppermost edge of the protuberance. The feed pan is supported by means of a frame having a plurality of radially extending support spokes connected to a spoke retention ring which resiliently urges the support spokes radially outwardly. This ring is discontinuous with an opening between two of the support spokes so that by compressing the ring at that point the ends of the support spokes may be placed within the feed pan and upon the release of said ring will engage the pan beneath the bead with the spoke retention ring above the bead so as to secure the pan to the support frame. The pan may be released by reversing the above procedure.

---

This invention relates to an animal feeding system and more particularly to a poultry feeding system.

Various feeding systems for poultry and other animals have been used in the past. The feed pans utilized in such a system must distribute the feed for poultry in a way that the bird can easily obtain the feed. The feed must also be distributed in a manner in which the poultry or other animals cannot waste it. It is readily apparent that any reduction in wastage will decrease feed costs and correspondingly increase profits.

The amount of feed consumed by poultry or other animals increases as the birds get larger. Therefore, the feed rate should be adjusted to meet the varying demands for food. The feed rate is varied in feeding systems either by adjustable feed control means, or utilizing feed pans with different feed flow characteristics, or by both. Thus, an efficient feeding system must have an adjustable feed control means and an easily changed feed pan. The present invention overcomes the limitations of feed systems previously used by providing a feed pan which distributes the feed in a manner which is more easily accessible by the animal to be fed.

Another object of the present invention is to provide a feed pan support wherein the feed pan is easily removed from the feed system.

Another object of the present invention is to provide feed control means which can be used with any feed pan.

For a fuller understanding of the nature and objects of the invention, reference should be had to the following detailed description taken in connection with the accompanying drawings, wherein:

FIGURE 1 is a fragmentary perspective view of the feed system;
FIG. 2 is a detailed view of the feeder pan assembly;
FIG. 3 is a sectional view of the feeder pan assembly;
FIG. 4 is a fragmentary view of the feed control means;
FIG. 5 is a sectional view of the feed pan assembly support from the conveyor; and
FIG. 6 is a fragmentary sectional view of the feed control means.

Referring now to the drawings in more detail, there is shown in FIG. 1 one preferred embodiment of the present invention. The feed pan assemblies 10 are connected to the horizontal feed conveyor 12. This feed conveyer is driven by the electric motor 14 in a manner well known in the conveying art. The feed hopper 16 supplies the feed conveyer 12 with feed which is distributed by the conveyer 12 to the various feed pan assemblies. In large feeding systems there are usually a plurality of rows of feed conveyers similar to the conveyer 12. These rows of feed conveyers are supplied by several feed storage hoppers 16, the storage hoppers 16 being supplied by a large overhead conveyer. The entire conveyer feed pan assembly can be lifted through the use of the cables 18. When the feed distribution system is lifted, the floor of the feeding room can be easily cleaned. As can be seen in FIG. 1, a wire 20 is utilized to keep the poultry from roosting on the conveyor 12. This wire 20 may be connected to a source of electrical potential so as to provide a mild shock to any bird which rests on the wire.

The feeder pan assembly is suspended from the conveyer 12 by means of a support cylinder 22. This support cylinder has suspended therefrom a wire support frame 24. The support frame is made up of a plurality of wire spokes 26 (see FIGS. 2 and 3). These wire spokes terminate at the upper end at a support disk 28 which is positioned between the conveyer tube 30 and the shoulders 32 of support cylinder 22. When the feed pan assembly 10 is raised off the floor of the feed room the support cylinder 22 is utilized to suspend the support disk 28 and the support frame 24. However, if the bottom of the feed pan assembly 10 rests on the floor of the feed room the feed conveyer 12 is supported by the support disk 28 and the pan support frame 24 from the feed pan 34. Thus, the pan assembly 10 may either be suspended from the feed conveyer 12 or, when the feed pan assembly 10 is resting on the floor, the feed conveyer 12 may be supported by the feed pan assembly 10.

As is seen in FIGS. 2 and 3, the support cylinder 22 terminates inside of a feed control cylinder 36. The feed control cylinder 36 is supported from a feed control cylinder support stand 38. The feed control support stand rests on the bottom of the feed pan 34. As will be explained more fully, the feed control cylinder 36 is adjustable vertically relative to the bottom of said feed pan 34 and the feed control support stand 38. The feed itself generally comes in the conveyer 12, falls through the opening 40 in the conveyer, through the support cylinder 22 and the feed control cylinder 36 onto the bottom of the pan 34. The vertical position of the feed control cylinder 36 will obviously vary the size of the opening 41 between the end of the feed control cylinder 36 and the bottom of the pan 34. An increase in the size of the opening 41 will increase the feed flow rate, while a decrease in the size of the opening will decrease the feed flow rate.

The feed pan 34, as best seen in FIG. 3, has vertical side portions 42 with a radially outwardly extending protuberance 44. This radially outwardly extending protuberance 44 terminates at its upper edge at an inwardly rolled bead 46. The lower portions of the sides of the feed pan 34 are connected to a radially inwardly extending horizontal ledge 48. The ledge is connected to a downwardly extending section 50. The section 50 is in turn connected to an upwarrdly extending conical section 52. The upper point of the cone formed by the conical section 52 is, as seen in FIG. 3, above the level of the ledge 48 and the upper portion of the conical surface 52 is enclosed by the feed control cylinder 36.

A feed pan having a bottom of the particular shape shown in FIG. 3 has been found to be very efficient when used with a feed control cylinder such as 36. The conical section 52 will cause the feed which is discharged through the feed control cylinder 36 to flow from the center of the pan to the depression 56 which is located approximately halfway between the edge and the center of the pan 34. The relatively deep depression 56 permits a relatively large amount of feed to be accumulated in the pan, so that the birds or other animals have access to a large supply of feed. The depression 56 also enables the last of the feed which is conveyed to the feed pan assembly to be distributed outwardly by the conical section 52 from the center of the pan. Thus the last of the feed may be easily obtained by the birds from the depression 56.

The ledge 48 provides a relatively level and stable supporting base for the support stand 38 for the feed control cylinder 36.

The support frame 24 is connected to the feed pan 34 at the bead 46 at the upper edge of the feed pan. As is shown in FIG. 3, the support spokes 26 of the support frame terminate in hooks 60 which grasp the under edge of the bead 46. A spoke retention ring 62 is connected at substantially equal angular intervals to each of the support spokes 26. The circular spoke retention ring 62 has sufficient spring characteristics that it tends to resiliently force the support spokes 26 in an outwardly direction. The gap 64, when compressed by hand or other means, forces the spoke radially inward against the resilient bars of the spoke retention ring. Thus the support frame 24 may be connected to and disconnected from the feed pan by displacing the hooks 60, of the spokes 26, relative to the feed pan bead 46. It should be noted that the spoke retention ring 62, in addition to biasing the spokes in a radially outward direction, so that they will grasp the bead 46, also serve to position the hooks 60 vertically relative to the bead 46. This construction of a feeder pan support frame 24 which can be engaged and disengaged from the feed pan 34 merely by grasping two of the support spokes 26 and forcing them toward each other enables the pan 34 to be easily removed from the support frame 24. Another pan with a similar bead, or the same pan, may be placed on the support frame 24 with a minimum amount of effort in the same manner.

The support cylinder 22 is positioned longitudinally on the conveyer 12 by two positioning flanges 66 which depend from the opening 40 (see FIG. 3). The positioning flanges 66, as is clearly shown in FIG. 5, are located on the lower portion of the conveyer 12. The support cylinder 22 has an opening 68 to receive the positioning flanges 66 of the conveyer 12. When the support cylinder 22 is placed on the conveyer 12 it must, in order to align the opening 68 and flanges 66, be in a position which is upside down from its normal position. Thus, the opening 68 will be positioned in such a manner that the positioning flanges 66 may be slid inside of the support sylinder 22, the support cylinder 22 being rotated to the upright position shown in FIGS. 2 and 3, with flanges 66 both inside of the support cylinder 22. Thus, the positioning flange 66 serves to position each of the feed pan assemblies 10 longitudinally on the conveyer 12.

The support cylinders 22, as is best shown in FIG. 5, have an insulating member 70 which serves to insulate the wire 20 from the feed assembly. If the wire 20 is electrically charged to prevent the birds from roosting on the wire, the pans will not be electrically charged. The insulating member 70 will insulate the feed pan assembly and thereby protect the feeding birds.

The feed control cylinder 36, as is shown in FIG. 4, has a plurality of indexing holes 72 arranged in helically spaced relationship. These holes are designed to be engaged by one of the support legs 74 of the feed control support stand 38. When an end of the support legs 74 is positioned in one of the holes 72, the feed pan control cylinder 36 is positioned vertically relative to the conical section 52. The vertical position of the feed control cylinder 36 relative to the conical section 52 determines the size of gap 41 between the end of the feed control cylinder 36 and the conical surface. This gap will, since all of the feed in the conveyer must flow through the gap before reaching the depression 56 in the feed pan, regulate the feed flow rate. The two legs 74 of the feed control cylinder support stand 38 which are not placed in one of the holes 72 of the feed control cylinder are placed in one of two angular or helical slots 75 formed in the feed control cylinder. Since the slots 75 and the holes 72 are positioned parallel to each other, the moving of one of the support legs 74 which is indexed in one of the holes 72 will result in the moving of the other two support legs in the slots 75. The feed control cylinder 36 may be positioned vertically by merely removing one leg 74 from its particular indexing hole 72 and placing it in a selected indexing hole which is either above or below its original position.

This particular indexing structure, that is the hole 72 and the slots 75, permits the feed control cylinder 36 to be vertically indexed with a minimum amount of effort, since only one of the support legs 74 must be moved from its hole 72 in order to change the vertical position of the feed control cylinder 36.

It should also be noted that the feed control support stand 38 rests directly on the bottom of the feed pan 34. Thus, the feed control cylinder 36 may be manually lifted or otherwise moved without disturbing the vertical position of the feed control cylinder relative to the feed control support stand. When the manual lifting of the feed control cylinder has been terminated and the feed control cylinder is placed back to its normal position, the position of the feed control cylinder relative to the conical surface and thus the flow rate will be the same as before the feed control cylinder was lifted. This feature of being able to manually lift or otherwise agitate the feed control cylinder 36 is especially desirable when the feed becomes jammed between the openings in the feed control cylinder 36 and the conical surface 52 or during initial starting of the feed. Thus, the feed flow can be started, by manually lifting the cylinder or one of the support legs 74 and placing the feed control cylinder back in its original position.

A feed saver ring 76 is connected to each of the feed control support stand legs 74. The feed saver ring 76 prevents poultry from being able to scratch out the feed at the base of the feed control cylinder 36 and thus waste the feed. When the feed control ring 76 is connected in the manner shown in FIG. 4, to the feed control support stand, it is automatically maintained at the same height and position relative to the conical section 52, regardless of where the feed control cylinder 36 is positioned. In addition to positioning the feed saver ring and permitting easier adjustment of the feed control cylinder 36, the present support means 38 enables the user of the feed pan assembly 10 to tell at a glance what level the feed control cylinder is at. The indexing holes 72 of the feed control cylinder are clearly visible from the side of the feed pan assembly.

The support stand 38 for the feed control cylinder rests on the bottom of the feed pan 34. Thus, the support stand may be used with different feed pans having a variety of desired configurations. Since the feed pan 34 may be easily removed from the feed pan assembly 10 and the feed control means used with any pan, regardless of shape, it is seen that the feed flow rate may be easily adjusted by removing the pan 34 and placing another pan which has a differently shaped conical surface in place of the feed pan shown. Thus, two means of varying the feed flow rate are provided with the novel feed pan assembly disclosed in this application. Either the feed control cylinder 36 may be varied vertically relative to the bottom of the pan, or the feed pan itself may be replaced with one having a differently shaped bottom and consequently a different feed flow rate.

The feed pan assembly 10 may be placed on the conveyer 12 either as a unit, as shown in FIG. 2, or with the feed pan 34 removed and the feed control cylinder 36 removed. To assemble the feed pan assembly shown in FIG. 2, without the feed pan 34 and feed control cylinder 36, the pan support frame 24 would be placed on the support cylinder 22. The support cylinder 22 would then be slid onto the feed conveyer 12, rotated so that the opening 68 and the positioning flange 66 of the conveyer, would be aligned. The support cylinder 22 would be positioned longitudinally with the flanges 66 inside the support cylinder. The support cylinder 22 would then be rotated to the position shown in FIG. 3. Once the support cylinder is in the position shown in FIG. 3, the feed pan 34 can easily be placed on the wire support frame 24 with the feed control cylinder inside the pan, as shown in FIG. 3.

From the description of the feed pan assembly thus far given, it is apparent that the feed pan 34 provides a structure in which the feed is collected in a depression which is easily accessible to the birds. The feed control cylinder 36 is easily positioned relative to the bottom of the feed pan 34 through the use of the indexing holes 72 which are visible from the side of the pan. The vertical position of the feed control cylinder 36 may be easily varied by merely moving one of the support legs 74. If desired, the entire feed pan assembly can be disassembled merely by compressing two of the wire support spokes 26 toward each other and compressing the spoke retention ring 62 and the support spokes 26. The feed pan 34 can be readily replaced by another pan of a different shape, if desired. This novel feed pan assembly provides advantages and a degree of flexibility which is unknown in the prior art devices.

While particular embodiments of the invention have been shown, it should be understood, of course, that the invention is not limited thereto, since may modifications may be made; and it is, therefore, contemplated to cover by the appended claims such modifications as fall within the true spirit and scope of the invention.

What is claimed is:

1. A feeder system comprising a feed source, a feed pan, means for conducting feed from said feed source to said feed pan and feed control means wherein said feed pan includes a substantially vertical side portion, a radially inward extending ledge connected to the bottom of said side portion, a downwardly sloping surface connected to said ledge, a conical surface connected to said downwardly sloping surface and a support frame for said pan including a plurality of radially extending support spokes, said support spokes being connected to the uppermost edge of said vertical side portion of said feed pan; said control means including a feed control cylinder, a single series of indexing holes in said feed control cylinder, a plurality of indexing slots in said feed control cylinder, and feed control cylinder support legs, said support legs having end portions received in said indexing slots with one support leg having an end portion selectively positioned in said single series of indexing holes whereby the feed control means is selectively held in position, the other ends of said support legs resting on said radially inward extending ledge; and said means for conducting said feed from said feed source to said feed pan including a feed conveyor, and a feed pan support cylinder operatively connected to both said feed conveyer and feed pan support frame, said support cylinder terminating within said feed control cylinder.

2. A feeder system comprising: a feed source, a feed pan, means for conducting feed from said feed source to said feed pan, means suspending said pan at a fixed position beneath said means for conducting feed control means including a vertically adjustable feed control cylinder having a single series of indexing holes and a plurality of indexing slots therein, and support means for said feed control means including a plurality of support legs, one end of said legs being in contact with the bottom of said pan and the other end of said support legs being received in said indexing slots with one support leg having said other end selectively positioned in said single series of indexing holes whereby the feed control means is selectively held in position.

3. A feed system comprising: a feed source, a feed pan having a substantially vertical side portion and a bottom portion including an inwardly and downwardly sloping surface connected to said side portion by a radially inward extending ledge, said downwardly sloping surface joining an upwardly extending conical surface at a point spaced radially from the edge of the feed pan, means for conducting feed from said source to said pan, means suspending said pan at a fixed position beneath said means for conducting feed and separate feed level adjusting means including a feed control cylinder and support legs for said cylinder, one end of said legs resting on said ledge in the bottom portion of said feed pan, and the other end of said legs adjustably attached to said cylinder so that said cylinder is positionable vertically relative to said conical surface to thereby alter the flow of feed into said pan, said cylinder and support legs being movable as a unit along said ledge in said feed pan to agitate the feed flowing into said feed pan.

4. A feeder device comprising: a feed pan including side portions having an inwardly projecting bead along the uppermost edge of said feed pan, and a support frame for said feed pan including a plurality of radially extending support spokes, said spokes secured with a support means at one end and a spoke retention ring interconnecting said spokes near the other free ends, said ring being discontinuous with an opening therein between two of said spokes so as to resiliently urge said support spokes radially outwardly, said support frame being compressible radially inwardly against the resilient retention ring at said opening so that the free end of said spokes may be placed within said feed pan beneath said bead, with said ring being outside of said pan above said bead, whereby upon the release of said support frame, the free ends of said spokes and said ring engage said feed pan to rigidly secure said support frame thereto.

5. Feeder apparatus for use with means for conducting feed from a source to said apparatus, said feeder apparatus comprising: a tubular discharge means secured with the means for conducting feed, a feed pan having a side portion and a bottom portion, and separate feed level adjusting means including a feed control cylinder in telescopic relation with said tubular means and support legs for said cylinder, one end of said support legs resting on the bottom portion of said feed pan, and the other end of said legs adjustably attached to said cylinder so that said cylinder is positionable vertically relative to the bottom portion of said feed pan to thereby alter the flow of feed into said pan from said tubular means, said cylinder and support legs being free of any connection with and movable as a unit in said feed pan about said tubular means to agitate the feed flowing into said pan.

6. A feeder device adapted for connection to a feed conveyer, said feeder device comprising: a feed pan having an annularly outwardly extending protuberance and an inwardly projecting portion along the uppermost edge of said protuberance, a support disc connected to said feed conveyer, and a support frame for said feed pan including a plurality of radially extending support spokes, one end of said spokes being attached to said support disc, and a resilient spoke retention ring interconnecting said spokes near the other radially outwardly facing free ends of the latter, said ring being discontinuous between two of said spokes and resiliently urging said support spokes radially outwardly, said support frame being compressible radially inwardly against the resilient retention ring so that said radially outwardly facing free ends of said spokes may be placed within said feed pan beneath said inwardly projecting portion, with said ring being outside of said pan above said portion whereby upon the release of said support frame said inwardly projecting portion is secured between the free ends of said spokes and said ring, and said support frame is attached to said feed pan.

7. A feeder device as claimed in claim 6 wherein said device further includes a tubular member depending from said support disc within said feed pan and vertically adjustable feed control means located within said feed pan in telescopic relation with said tubular member.

References Cited

UNITED STATES PATENTS

| | | | |
|---|---|---|---|
| 954,968 | 4/1910 | Jocoy | 119—52 |
| 985,201 | 2/1911 | Owens | 119—52 |
| 1,149,477 | 8/1915 | Thompson | 119—53 |
| 1,154,073 | 9/1915 | Stocking | 119—52 |
| 1,662,204 | 3/1928 | Parkhurst | 119—61 |
| 2,084,240 | 6/1937 | Buckle | 119—61 |
| 2,513,200 | 6/1950 | Pax | 119—53.5 |

HUGH R. CHAMBLEE, *Primary Examiner.*

Disclaimer 3,388,690.—*Eldon Hostetler*, Middlebury, Ind. POULTRY FEEDER SYSTEM AND PAN ASSEMBLY THERFOR. Patent dated June 18, 1968. Disclaimer filed Oct. 9, 1973, by the assignee, *Chore-Time Equipment Inc.*

Hereby enters this disclaimer to claims 4, 6 and 7 of said patent.

[*Official Gazette December 25, 1973.*]